(12) United States Patent
Houlberg (10) Patent No.: US 6,718,409 B2
(45) Date of Patent: Apr. 6, 2004

(54) NATIONAL MARINE ELECTRONICS ASSOCIATION PROTOCOL CONVERTER

(75) Inventor: Christian L. Houlberg, Ventura, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 504 days.

(21) Appl. No.: 09/828,378

(22) Filed: Apr. 6, 2001

(65) Prior Publication Data

US 2002/0188776 A1 Dec. 12, 2002

(51) Int. Cl.⁷ .............................. G06F 13/12; G06F 3/00
(52) U.S. Cl. ............................ 710/62; 710/8; 710/11; 710/72; 73/178; 455/345
(58) Field of Search .............................. 710/8, 11, 20, 710/31, 33, 62, 72, 73

(56) References Cited

U.S. PATENT DOCUMENTS

| | | | | |
|---|---|---|---|---|
| 4,821,217 A | * | 4/1989 | Jackson et al. ................. | 701/3 |
| 5,377,109 A | * | 12/1994 | Baker et al. ................... | 701/14 |
| 6,072,571 A | * | 6/2000 | Houlberg ............... | 356/139.04 |
| 6,499,027 B1 | * | 12/2002 | Weinberger .................... | 707/4 |

FOREIGN PATENT DOCUMENTS

| EP | 0 807 888 A1 | * | 11/1997 | ........... G06F/13/40 |
|---|---|---|---|---|
| WO | WO 99/24909 | * | 5/1999 | ........... G06F/13/42 |

OTHER PUBLICATIONS

–John D. Cremin, "Generating Low Cost Serial Waveforms for GPS Applications", Saint Louis University.*
–"ARINC 429 to NMEA 0183 Protocol Converter" ©2003. http://www.yed.com/A429toNMEA.htm☐☐http://www.hotektech.com/yedconverters.htm.*

* cited by examiner

Primary Examiner—Jeffrey Gaffin
Assistant Examiner—Angel L Casiano
(74) Attorney, Agent, or Firm—David S. Kalmbaugh (57) ABSTRACT

A protocol converter for use on board an aircraft with space limitations which converts navigation data from one format to another format for use by the aircraft's moving map display. The navigation data is supplied by an aircraft inertial navigation unit to the protocol converter in the ARINC-429 protocol which converts the data to the NMEA-0183 protocol. The converted data is then supplied to a moving map display on board the aircraft. An interface board receives ARINC navigational data from the aircraft navigation unit and stores the data prior to its transfer to a digital computer. The computer reads the data stored in the interface board including a status word which indicates the validity of the data. A computer software program within the computer converts the ARINC-429 navigational data to NMEA-0183 protocol data. The NMEA-0183 protocol data is transmitted through an RS-232 serial port to the moving map display.

20 Claims, 5 Drawing Sheets

NATIONAL MARINE ELECTRONICS ASSOCIATION PROTOCOL CONVERTER

BACKGROUND OF THE INVENTION

1. Field of the Invention

This invention relates to a computer system for converting a data stream from one protocol to another protocol. More particularly, this invention relates to a computer system for converting a data stream from the ARINC binary data bus standard 429 to the National Marine Electronics Association standard 0183.

2. Description of the Prior Art

The P-3 domed aircraft has a moving map display in the aircraft for use by the U.S. Customs agency in its surveillance programs which generally involve monitoring drug trafficking. The moving map display uses a computer installed on board the P-3 for displaying a moving map. The computer and its moving map software called "falcon view" require navigation data to be provided to the computer in the National Marine Electronics Association standard 0183 (NMEA-0183). The P-3 aircraft's inertial navigation unit, however, provides navigation data in the ARINC-429 format.

Accordingly, there is a need to convert the navigation data provided by the P-3 aircraft's inertial navigation unit from the ARINC-429 format to the NMEA-0183 format to allow the data to be used by the moving map display'computer. In addition, there is a need to provide a means for converting the navigation data which is small in size because of space limitations on board the P-3 aircraft.

SUMMARY OF THE INVENTION

The present invention overcomes some of the difficulties encountered in the past including those mentioned in that it comprises a highly efficient and effective computer based protocol converter for use on board aircraft with space limitations which converts navigation data from one format to another format for use by the aircraft's moving map display computer. The navigation data is supplied by an on board aircraft inertial navigation unit to the protocol converter in the ARINC-429 protocol which converts the data to the NMEA-0183 protocol. The converted navigation data is then supplied to a moving map display on board the aircraft.

An interface board which is compatible with the ARINC-429 protocol receives ARINC navigation data from the aircraft navigational unit and stores the data prior to its transfer to a PC/AT compatible digital computer. The computer reads the data stored on the interface board including status bits which indicates the validity of the data. A computer software program within the computer converts the ARINC-429 navigational data to NMEA-0183 protocol data. The NMEA-0183 protocol data is transmitted through an RS-232 serial port to the moving map display.

DETAILED DESCRIPTION OF A PREFERRED EMBODIMENT

Figure 1:
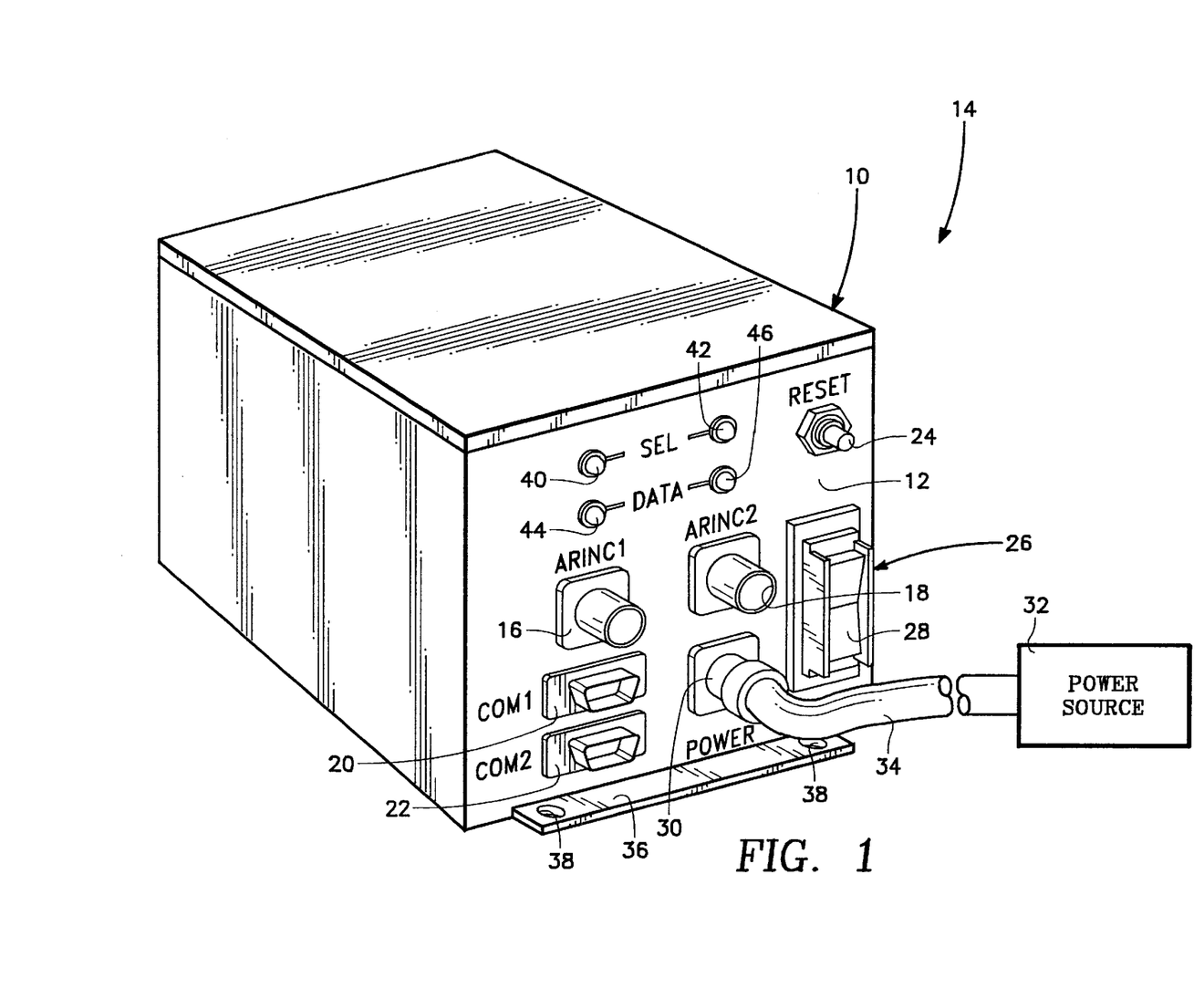
FIG. 1 is a perspective view of the protocol converter housing and front panel of the protocol converter comprising the present invention.
Figure 5:
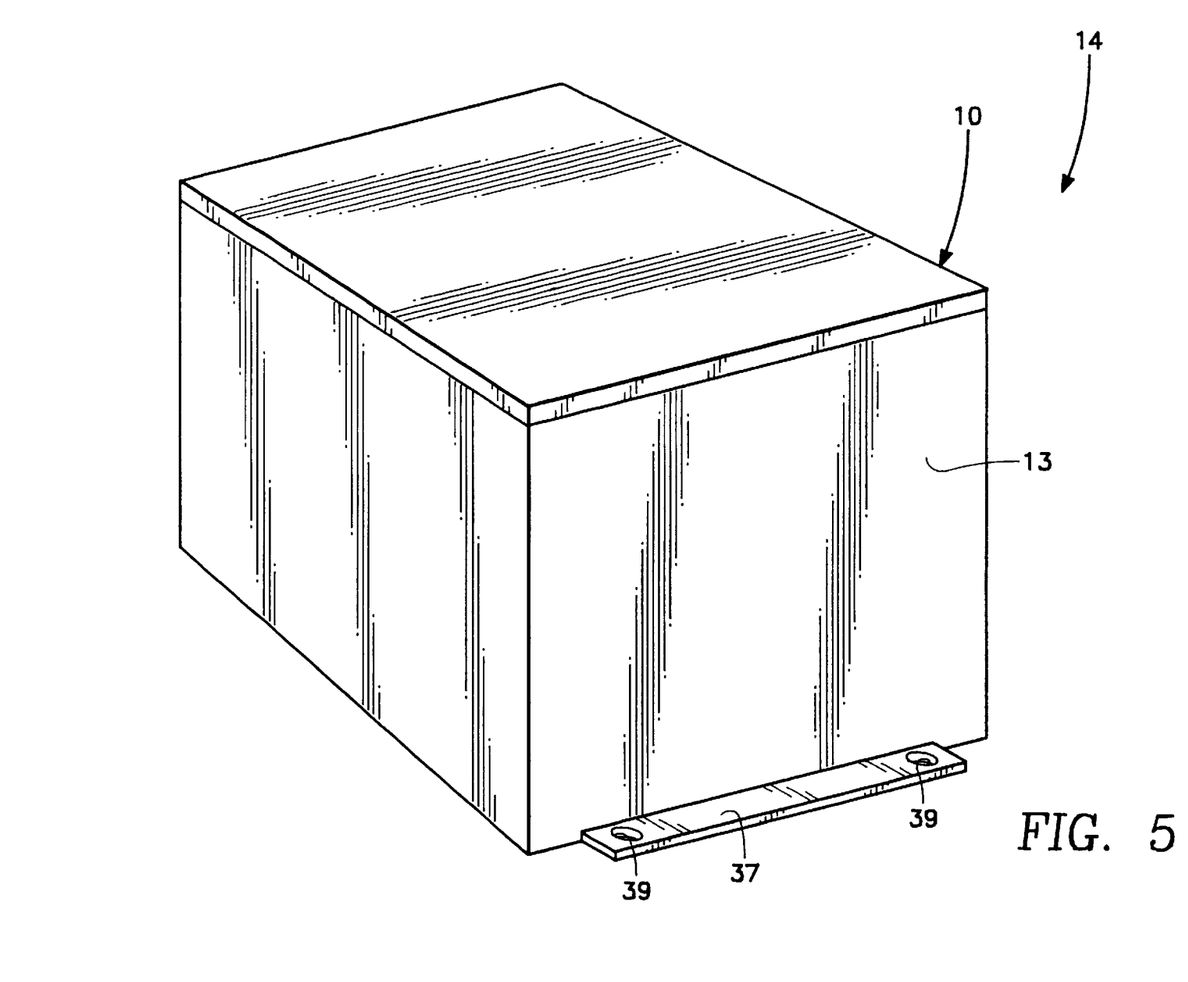
FIG. 5 is a perspective view of the protocol converter housing and rear panel of the protocol converter comprising the present invention.

Referring to FIGS. 1 and 5, there is shown a housing 10 which includes a front panel 12 for the computer based protocol converter 14 comprising the preset invention. Front panel 12 has a pair connectors 16 and 18 (respectively labeled "ARINC1" and "ARINC2") for two ARINC 429 data inputs. The data source located on board a P-3 aircraft for driving these inputs is the high speed ARINC 429 binary bus that is output by the P-3 Aircraft Inertial Navigation Unit which is the Model LTN-92 manufactured by Litton Aero Space of Woodland Hills, Calif. One of the connectors 16 is the input for the ARINC 429 data stream while the other connector 18 is a backup connector. A shielded twisted pair cable with a mating connector plug may be used with connector 16 or connector 18 to connect the protocol converter 10 to the ARINC 429 binary bus.

The front panel 12 of protocol converter 14 also includes a pair of RS-232 ports/connectors 20 and 22 (labeled respectively as COM1 and COM2). The COM2 connector 22 is used to drive the moving map display with data being provided in the NMEA-0183 format. Data output from connector 22 is at 9600 BPS and includes 8 data bits and 1 stop bit. Parity bits are not provided in the output. A shielded twisted pair may be used to connect the COM2 port 22 output to the moving map display.

The COM1 connector 20 is the RS-232 port/connector used to communicate with an external serial terminal. Typically, the terminal is a laptop computer which utilizes serial communications software to transfer data to protocol converter 14. In addition, the laptop computer is used only during maintenance, thus aircraft cabling is not required for data being transferred to protocol converter 14 via the COM1 connector 20.

The front panel 12 for protocol converter 14 has a reset button 24 which when depressed performs a system reset for protocol converter 14. There is also a one amp circuit breaker 26 which protects the internal electrical components of the protocol converter 14 as well as the P-3 aircraft electrical system. The circuit breaker 26 is reset by depressing reset button 28.

Power for the protocol converter 14 is provided via a power connector 30. Power for protocol converter 14 is from an external power supply 32 which supplies 28 VDC via a shielded cable 34.

A mounting flange 36 attached to the bottom of front panel 12 is used to secure the housing 10 of protocol converter 14 to the aircraft. Two mounting holes 38 are provided through which mounting bolts or the like may be inserted so that housing 10 may be secured to the support structure for the aircraft. An identical mounting flange 37 is attached to the bottom of the rear panel 13 of housing 10 (FIG. 5). Mounting flange 37 also has two mounting holes 39 through which mounting bolts may be inserted to secure housing to the aircraft support structure.

Housing 10 including the two mounting flanges has an overall length of 7.95 inches, a width of 4.95 inches and a height of 4.16 inches. Without the mounting flanges the length of housing 10 is 6.97 inches. The mounting holes 38 in each of the two flanges are spaced apart center to center 3.15 inches with each flange having an overall length of 3.94 inches.

The front panel 12 has a pair of SEL light indicators 40 and 42 and a pair of DATA light indicators 44 and 46. The DATA light indicators 44 and 46 provide feedback information regarding which ARINC bus inputs are active. The following sets forth the light indicators 44 and 46 monitoring of data activity on the ARINC bus inputs 16 and 18:

Off: No data has been received on the ARINC input for at least two seconds.

On: Data is being received on the ARINC input.

Blinking: Data is being received on the ARINC input, but the time of day data word has not been updated for at least ten seconds. This condition may indicate that inertial navigation unit is no longer receiving GPS updates.

Although protocol converter 14 only requires a single ARINC input for data conversion, both ARINC inputs 16 and 18 are monitored for data input activity. The SEL indicators 40 and 42 show which one of the two COM ports 20 or 22 is currently selected to drive the moving map output on the protocol converter 14.

If data has not been detected on either ARINC ports 16 and 18 for at least two seconds, both of the SEL indicators 40 and 42 are turned off and protocol converter 14 will not output data to the moving map display.

If all of the indicators 40, 42, 44 and 46 are blinking, it means that the ARINC interface board 58 located inside protocol converter 14 has failed to initialize properly.

Figure 2:
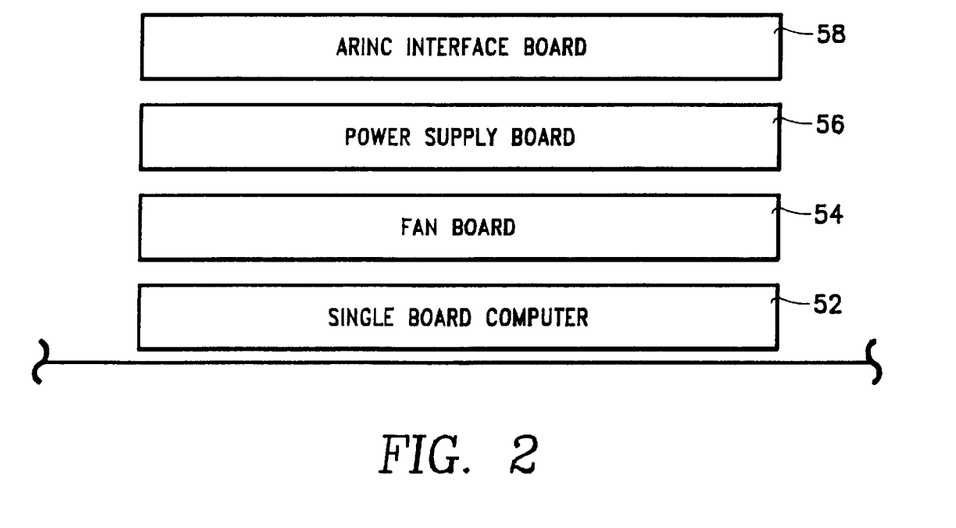
FIG. 2 is a view illustrating the stacking arrangement of the electronics boards with the housing of the protocol converter converter of FIG. 1.

Referring to FIG. 2, there is shown the stacking arrangement for electronics board and the fan board inside the housing 10 of protocol converter 14. A single board computer 52 is positioned at the bottom of the stack. A fan board 54 is positioned on top of the single board computer 52. Next in the stack is a power supply board 56. The top board on the stack is the ARINC interface board 58. The boards 58, 52, 54 and 56 are interconnected to one another via an ISA computer bus.

The single board computer 52 used in the preferred embodiment of the present invention is an Ampro Computer, Inc. of San Jose, Calif., 486DX-based PC/AT compatible system with a PC/104 compatible expansion bus. Computer 52 is a CoreModule/4DXe module which includes a Central Processing Unit, RAM, embedded-PC bios, keyboard and speaker interfaces, two RS-232C serial ports, a bi-directional parallel port, a floppy disk controller and a an IDE hard disk controller. Commercially available and public domain software for IBM PC and PC/AT computers can be used to program single board computer 52.

Power supply board 56 is a power supply which receives 28 VDC from an external source via power connector 30 and provides +12 VDC, −12 VDC, +5 VDC and −5 VDC for ARINC interface board 58, computer 52 and fan board 54.

ARINC interface board 58 is an interface which is Industry Standard PC/104 compatible and supports ARINC-429 avionics data buses. The interface board 58 is a Model CEI-400 ARINC interface commercially available from Condor Engineering Inc. of Santa Barbara, Calif. Interface board 58 uses an 8-bit PC/104 bus, while passing through 16-bit bus signals for other modules. The ARINC interface board 58 receives ARINC 429 formatted data from the P-3 aircraft inertial navigation unit, processes the data and then provides the data to computer 52 in accordance with a set of functions unique to the interface board 58.

Figure 3:
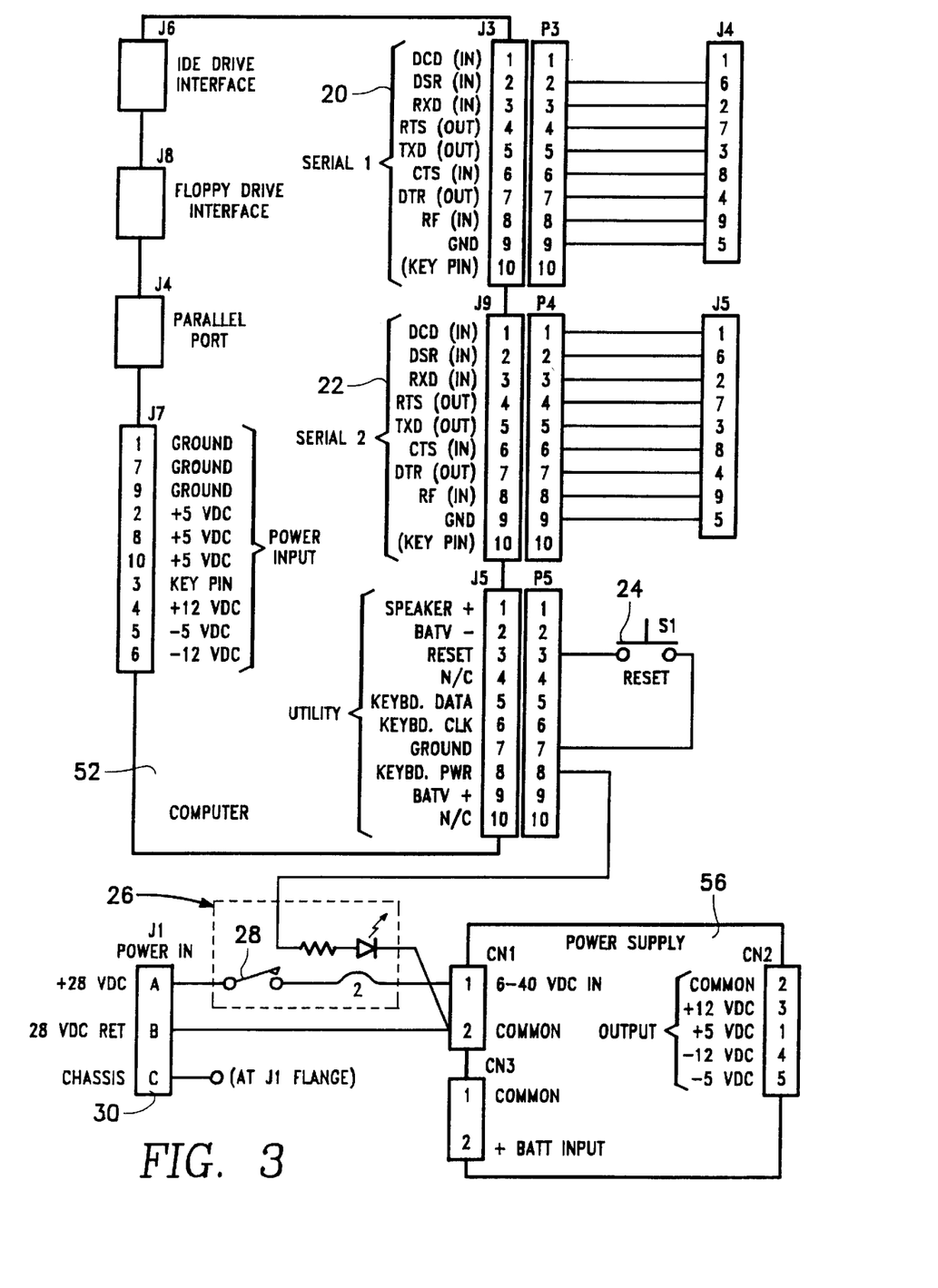
FIGS. 3 and 4 are detailed electronics schematic diagram of the protocol converter of FIG. 1.
Figure 4:
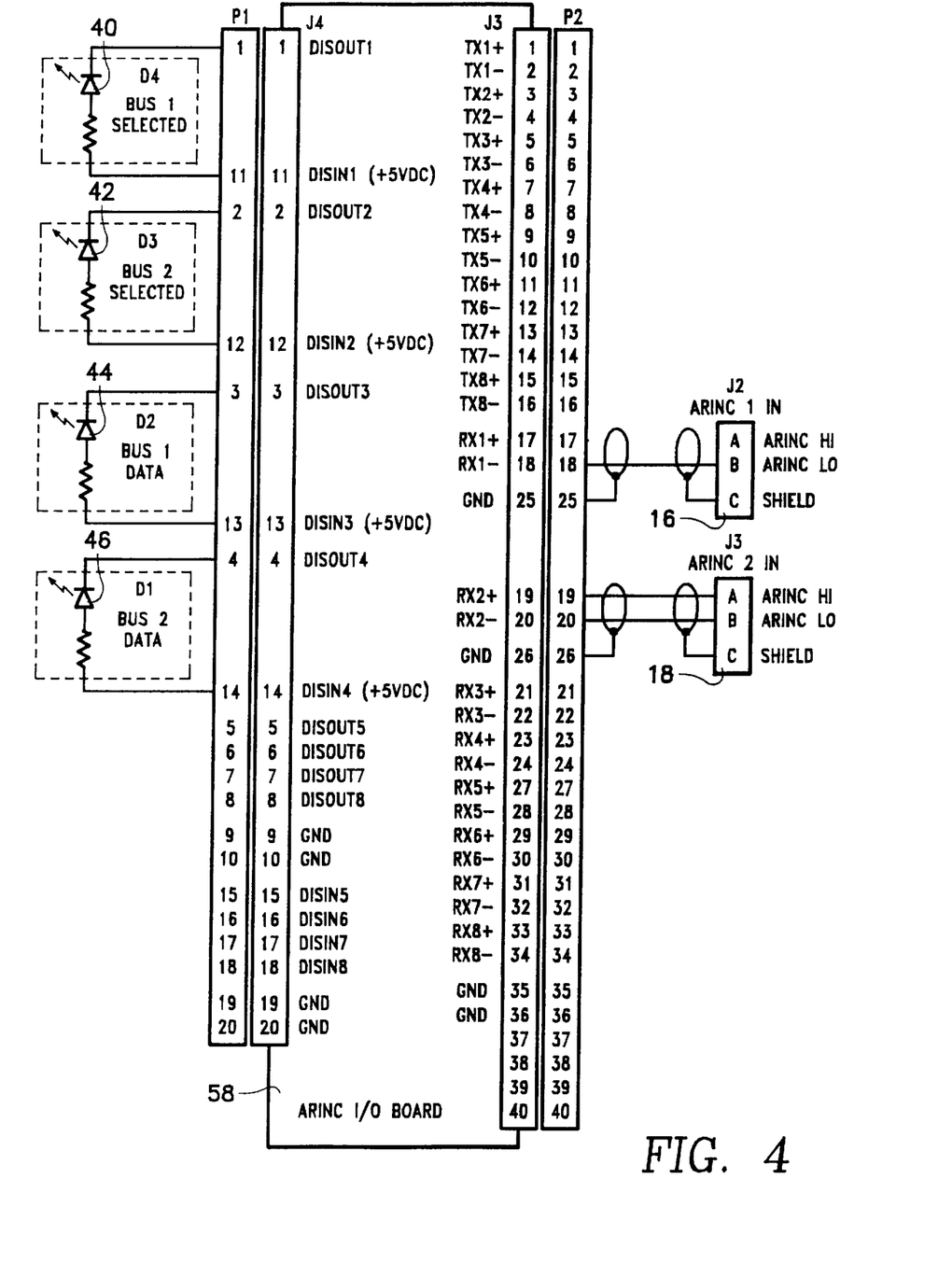

Referring to FIGS. 1, 3, and 4, when power is applied to protocol converter 14, the central processing unit within computer 52 boots to a DOS operating system which takes approximately 30 seconds. An AUTOEXEC.BAT file executes to configure protocol converter 14 and initiate the applications software. Once the applications software starts, the indicators 40, 42, 44 and 46 on front panel 12 are illuminated for approximately one second, then the indicators 40, 42, 44 and 46 turn off one at a time. The applications software enters a main program loop that monitors inertial data, reformats the data for the NMEA-0183 standard and sends the reformatted data to the moving map display.

Computer 52 through drivers initializes the ARINC interface board 58. Computer 52 through drivers also accesses or reads ARINC-429 data stored in memory in interface board 58. Two status bits within each 32 bit ARINC-429 data indicate whether valid data is stored within interface board 58. Computer 52 then converts the ARINC-429 navigational data to the NMEA-0183 format in accordance with its computer software program.

NMEA-0183 data is output to the moving map display via the TXD (transmit data out) line of RS-232 port 22 within computer 52. Computer first sends a request signal via the RTS (request to send) line first of port 22 to transmit data to the moving map display. The moving map display then sends a clear signal to computer 52 via the CTS (clear to send) line of port 22 indicating that the moving map display is ready to receive data. A ready signal transmitted by the moving map display to computer 52 via the DTR (data terminal ready) line indicates that the moving map display is on line.

Protocol converter 14 requires only one ARINC input 16 or 18 to be active during normal operation. If the second ARINC input has a cable connecting it to a second inertial navigation unit, the second ARINC input is used as an alternate. If the currently active ARINC input 16 or 18 become inactive for at least two seconds, protocol converter 14 attempts to use the other ARINC input as its data source. If data is not being provided to either ARINC input 16 or 18, protocol converter 14 will not output any data to the moving map display on board the P-3 aircraft.

Protocol converter 14 selects one of the two ARINC inputs 16 or 18 automatically, the selected ARINC input 16 or 18 normally being the input connected to the inertial navigation which is activated first in time. To switch to the other ARINC input 16 or 18 the operator must disconnect the inertial navigation unit which is currently providing data being processed by protocol converter 14. After two seconds, protocol converter 14 switches from the selected ARINC input 16 or 18 to the selected ARINC input 18 or 16, respectively, and will remain with that input as long as the data stream is being received by that input.

The NMEA-0183 protocol is an ASCII communication standard for sending navigational data to navigational equipment from a Global Positioning System receiver.

The ARINC 429 protocol is an industry standard that is utilized on virtually all commercial aircraft. It is a specification that defines a local area network for transfer of digital data between avionics system elements. The specification describes how an avionics system transmits information over a single twisted and shielded pair of wires (i.e. the data bus) to all other system elements having need of the information. The ARINC 429 protocol allows for up to as many as twenty receivers.

There are two speeds for data transfer, approximately 12.5 and 100 thousand bits per second. Words are 32 bits long including a label, parity bit and other fields. The label is an eight bit field that identifies the type of information contained in the word. The ARINC-429 protocol specification defines units, ranges, resolutions, refresh rates, number of significant bits, pad bits, etc. for the words transmitted by the different avionics system elements. The following illustrates the structure for the 32 bit ARINC word used in the software for protocol converter 14. The "?" mark represents the bits of significance.

```
struct Arinc
{
    unsigned long label   : 8;/* 0000   0000  0000  0000  0000  0000  ????  ????  */
    unsigned long data    :21;/* 000?   ????  ????  ????  ????  ????  0000  0000  */
    unsigned long ssm     : 2;/* 0??0   0000  0000  0000  0000  0000  0000  0000  */
    unsigned long p       : 1;/* ?000   0000  0000  0000  0000  0000  0000  0000  */
};
```

The label is set forth in the eight least significant bits of the 32 bit word. The label identifies to ARINC interface board 58 the type of data being provided to board 58 including latitude data, system time data and longitude data. The data being provided to board 58 is twenty one bits in length and is in binary except for system time which is provided in a binary coded decimal format. The next two significant bits comprises a status word which provides an indication as to the validity of the data. A binary three indicates that the data is valid. The most significant bit is a parity bit. The ARINC-429 status definitions are set forth as follows:

```
/* Status definitions */
#define FAILURE              0x00
#define NO_COMPUTED_DATA     0x01
#define FUNCTIONAL_STATUS    0x02
#define VALID                0X03
```

The following is a description of the manner in which the data resides in the data word.

```
#define ARINC_BOARD_1     0x0    /* Board number 1 */
#define ARINC_CHANNEL_1   0x0    /* Channel number 0 (INS data out) */
#define ARINC_CHANNEL_2   0x1    /* Channel number 1 (GPS data to INS) */
#define MAX_BCD_DIGITS    5      /* Maximum number of BCD digits (20 bits) */
#define MAX_BIN_DIGITS    21     /* Maximum number of digit + sign bit */
#define ARINC_TIMER_RATE  0x70   /* 1000 usec tick */
```

For example, BCD time has five digits (2400.0 for the five digits) and a scaling of 2400. ARINC 429 latitude has twenty bits plus a sign bit. ARINC 429 longitude data also has twenty bits plus a sign bit. The ARINC 429 interface board 58 is defined as board zero. Board 58 includes two channels for receiving data, channel zero and channel one. An initialization time period for board 58 "#define ARINC_TIMER_RATE 0x70" is also provided which sets up a one microsecond initialization time period for board 58.

The following are example ARINC 429 interface board commands for obtaining status and data:

```
status = ar_label_filter(ARINC_BOARD_1, TIME_CH_LABEL,
                        ARU_FILTER_OFF)
ar_get_latest(ARINC_BOARD_1, INSTAT_CH_LABEL,
             &arinc_word, &count)
```

The following are the label definitions for time, latitude, longitude, heading, pitch, roll and altitude and ground speed. Decimal numbers are utilized in the label definitions which are equivalent to octal code. For example, the time label is in decimal is 85 with its octal equivalent being 125.

```
/* Arinc Channel and Label (decimal value used). */
#define TIME_LABEL        85    /* System time (125) */
#define LAT_LABEL         200   /* Latitude (310) */
#define LONG_LABEL        201   /* Longitude (311) */
#define HEADING_LABEL     204   /* Heading (314) */
#define PITCH_LABEL       212   /* Pitch angle (324) */
#define ROLL_LABEL        213   /* Roll angle (325) */
#define ALT_LABEL         241   /* Inertial Altitude (361) */
#define SPEED_LABEL       202   /* Ground Speed (312) */
/* Channel and label combined. */
#define TIME_CH_LABEL     ARINC_CHANNEL_1,TIME_LABEL
#define LAT_CH_LABEL      ARINC_CHANNEL_1,LAT_LABEL
#define LONG_CH_LABEL     ARINC_CHANNEL_1,LONG_LABEL
#define HEADING_CH_LABEL  ARINC_CHANNEL_1,HEADING_LABEL
#define PITCH_CH_LABEL    ARINC_CHANNEL_1,PITCH_LABEL
#define ROLL_CH_LABEL     ARINC_CHANNEL_1,ROLL_LABEL
#define ALT_CH_LABEL      ARINC_CHANNEL_1,ALT_LABEL
#define SPEED_CH_LABEL    ARINC_CHANNEL_1,SPEED_LABEL
```

A channel and a label are also combined, that is a label is tied to a channel. Data is always read from the ARINC 429 bus via channel one. The other channel (channel number zero) is not used to monitor data, it is used by a GPS receiver to send GPS data to the inertial navigation system.

The structure for ARINC-429 data formats and the ARINC data formats are set forth as follows:

```
/* Structure of ARINC data formats */
struct Data_Format
{
        double scale;
        int digits;
        enum Encoding encoding;
};
/* ARINC data formats */
struct Data_Format formats[NUMBER_OF_WORDS] =
{
        { 2400.0,   5, BCD_TIME },      /* UTC Time (hours & minutes) */
        { PI/2.0,  20, ARINC429_BNR },  /* Pres-Pos LAT (radians) */
        { PI/2.0,  20, ARINC429_BNR },  /* Pres-Pos LONG (radians) */
        { PI/2.0,  15, ARINC429_BNR },  /* True Heading (radians) */
        { PI/2.0,  15, ARINC429_BNR },  /* Pitch Angle (radians) */
        { PI/2.0,  15, ARINC429_BNR },  /* Roll Angle (radians) */
        { 65536.0, 20, ARINC429_BNR },  /* MSL Altitude (feet) */
        { 2048.0,  15, ARINC429_BNR }   /* Ground Speed (knots) */
};
```

The NMEA-0183 protocol is an ASCII string that begins with a "$" sign and a label and ends with a checksum and a carriage return line feed. Each parameter within a NMEA sentence is separated by a comma. There are eight different sentences that are provided as outputs in the NMEA-0183 protocol which are as follows:

```
$GPGGA,223934,3406.898,N,11906.513,W,1,08,1.2,6.9,M,32.5,M,,*5D
$GPGSA,A,3,01,03,09,17,21,23,25,29,,,,,1.9,1.2,1.4*3F
$GPGSV,2,1,08,01,74,204,40,03,41,239,40,09,14,051,36,17,18,124,37*79
$GPGSV,2,2,08,21,60,018,40,23,32,061,38,25,08,176,36,29,09,221,35*7A
$PGRME,28.8,M,34.0,M,44.5,M*1E
$GPRMB,A,0.03,R,GVO ,KNTD ,3407.15,N,11907.18,W,0.6,294.9,,A*68
$GPBOD,117.5,T,103.4,M,KNTD ,GVO *28
$GPWPL,3431.87,N,12005.46,W,GVO *09
$GPRMC,223935,A,3406.899,N,11906.513,W,,,060897,014.1,E*6D
$GPGGA,223935,3406.899,N,11906.513,W,1,08,1.2,6.7,M,32.5,M,,*53
$GPGSA,A,3,01,03,09,17,21,23,25,29,,,,,1.9,1.2,1.4*3F
```

The letters "GP" represent global positioning, the letters "GPGGA"; "GPGSA"; "GPRME"; "GPRMB" and "GPRMC" are output to the moving map display. The remaining sentences are output to the moving map display for completeness. The data following the letters "GPGGA" includes time data, latitude data (letters N/S) and longitude data (letters E/W) as well as units for the data. For example altitude data is provided in meters designated by the letter "M".

The following is the NMEA-0183 definition information for the latitude, longitude, altitude and other relevant data following the letters "GPGGA":

```
GGA:    Global Positioning System Fix Data
        GGA,hhmmss.ss,1111.111,a,yyyyy.yyy,a,x,xx,x.x,xxxxx.x,M,
        xxx.x,M,xx.x,xxxx*hh<CR><LF>
        hhmmss.ss:   UTC of position
```

-continued

```
        111.11,a:    Latitude,N/S
        yyyyy.yy,a:  Longitude, E/W
        x:           GPS Quality indicator
                     0 = Fix not available or invalid
                     1 = GPS SPS Mode, fix valid
                     2 = Differential GPS, SPS Mode, fix
                         valid
                     3 = GPS PPS Mode, fix valid
        xx           Number of satellites in use, 00-12
        x.x          Horizontal dilution of precision
        x.x,M        Altitude re: mean-sea-level (geoid) ,meters
        x.x,M        Geoidal separation,meters
                     The difference between the WGS-84 earth
                     ellipsoid and mean-sea-level (geoid),
                     "_" = below ellipsoid
        x.x          Age of Differential GPS data
                     Time in seconds since last SC104 Type 1
                     or 9 update, null field wien DGPS is not
                     used.
        xxxx         Diferential reference station ID, 0000-1023
```

The following indicates the NMEA-0183 definitional information being provided following the letters "GPGSA"; "GPRME"; "GPRMB" and "GPRMC":

```
GSA:    GNSS DOP and Active Satellites
        GSA,a,x,xx,xx,xx,xx,xx,xx,xx,xx,xx,xx,xx,xx,x.x,x.x,x.x,*hh
        <CR><LF>
        a           Mode:   M = Manual, forced to operate in 2D
                            or 3D mode
                            A = Automatic, allowed to
        automatically switch 2D/3D
        x           Mode:   1 = Fix not available
                            2 = 2D
                            3 = 3D
        xx          ID numbers of satellites used in solution
        (null for unused fields).
        x.x         PDOP
        x.x         HDOP
        x.x         VDOP
RME:    Proprietary Sentence (Recommended Minimum ?????)
        RME,x.x,M,x.x,M,x.x,M*hh<CR><LF>
        x.x,M       ???,meters
```

-continued

```
          x.x,M       ???,meters
          x.x,M       ???,meters
RMB:      Recommended Minimum Navigation Information
          RMB,A,x.x,a,c--c,
          c--c,1111.11,a,yyyyy.yy,a,x.x,x.x,x.x,A*hh<CR><LF>
          A              Data status:  A = Data valid, V = Navigation
                                       receiver warning
          x.x            Cross track error - nautical miles
          a              Direction to stear - L/R
          c--c           Origin waypoint ID
          c--c           Destination waypoint ID
          1111.11,a      Destination waypoint latitude,N/S
          yyyyy.yy,a     Destination waypoint longitude, E/W
          x.x            Range to destination, nautical miles
          x.x            Bearing to destination, degrees True
          x.x            Destination closing velocity, knots
          A              Arrival status: A = arrival circle entered or
                                         perpendicular passed
                                         V = not entered/passed
BOD:      Bearing - Origin to Destination
          BOD,x.x,T,x.x,M,c--c,c--c*hh<CR><LF>
          x.x,T          Bearing, degrees True
          x.x,M          Bearing, degrees Magnetic
          c--c           Destination waypoint ID
          c--c           Origin waypoint ID
WPL:      Waypoint Location
          WPL,1111.11,a,yyyyy.yy,a,c--c,*hh<CR><LF>
          1111.11,a      Waypoint latitude,N/S
          yyyyy.yy,a     Waypoint longitude,E/W
          c--c           Waypoint identifier
RMC:      Recommended Minimum Specific GNSS Data
          RMC,hhmmss.ss,A,1111.11,a,yyyyy.yy,a,x.x,x.x,xxxxxx,x.x,
          a*hh<CR><LF>
          hhmmss.ss UTC of position fix
          A              Status:    A = Data valid, V = Navigation
                                    receiver warning
          1111.11,a Latitude,N/S
          yyyyy.yy, a    Longitude, E/W
          x.x            Speed over ground, knots
          x.x            Course Over Ground, degrees True
          xxxxxx         Date:       ddmmyy
          x.x,a          Magnetic variation, degrees E/W
```

From the foregoing, it may readily be seen that the present invention comprises a new, unique and exceedingly useful protocol converter for converting navigational data from the ARINC-429 protocol to the NMEA-0183 protocol which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A protocol converter for use on board aircraft comprising:
   a housing having a front panel;
   a computer board positioned in a stack within said housing;
   an interface board positioned in said stack within said housing, said interface board being connected to said computer board;
   a power board positioned in said stack within said housing, said power board being connected to said interface board and said computer board to provide electrical power to said interface board and said computer board;
   said interface board having a pair of data inputs, one of said pair of data inputs receiving ARINC-429 navigation data from a source within said aircraft, said interface board storing said ARINC-429 navigation data therein;
   said computer board including a computer software program for operating said computer board, said computer board, responsive to said computer software program, reading said ARINC-429 navigation data from said interface board and then converting said ARINC-429 navigation data to NMEA-0183 navigation data;
   said computer board providing a request to send signal to a moving map display located on board said aircraft to effect a transfer of said NMEA-0183 navigation data to said moving map display;
   said computer board, responsive to a clear to send signal from said moving map display transferring said NMEA-0183 navigation data to said moving map display.

2. The protocol converter of claim 1 wherein said housing comprises a box shape structure having a length of 6.97 inches, a width of 4.95 inches and a height of 4.16 inches.

3. The protocol converter of claim 2 wherein said housing has a first flange attached to said front panel and a second flange attached to a rear panel of said housing, said first and second flanges being adapted for mounting said protocol converter on said aircraft, said first and said second flanges each having a pair of mounting holes, said protocol converter including said first and said second flanges having an overall length of 7.95 inches.

4. The protocol converter of claim 1 wherein said power board provides said electrical power to said interface board and said computer board at power levels of +5 VDC, −5 VDC, +12 VDC and −12 VDC.

5. The protocol converter of claim 1 wherein said ARINC-429 navigation data comprises 32 bit data words, each of said 32 bit data words has an eight bit label field, twenty one data bits, a pair of status bits and a parity bit.

6. The protocol converter of claim 5 wherein said computer board reads said pair of parity bits of each of said 32 bit data words to determine when said 32 bit data words contain valid navigation data, said valid navigation data occurring whenever said pair of parity bits consist of a pair of logic ones.

7. The protocol converter of claim 1 further comprising a fan board positioned in said stack within said housing.

8. The protocol converter of claim 1 further comprising first, second, third and fourth indicator lights located on the front panel of said housing, said first, second, third and fourth indicator lights being connected to said interface board, said first and second indicator lights when activated indicating which one of said pair of data inputs on said interface board is receiving ARINC-429 navigation data from a source.

9. The protocol converter of claim 8 wherein said third and fourth indicator lights when activated indicating which of a pair of serial outputs on said computer board is transferring said NMEA-0183 navigation data to said moving map display.

10. The protocol converter of claim 1 further comprising a circuit breaker connected to said power board, said circuit breaker including a reset button to reset said circuit breaker after circuit breaker deactivates said protocol converter, said circuit breaker being mounted on the front panel of said housing.

11. The protocol converter of claim 1 further comprising a reset switch connected to said computer board, said reset switch being mounted on the front panel of said housing.

12. A protocol converter for use on board aircraft comprising:
   a housing having a front panel;
   a computer board positioned in a stack within said housing;
   an interface board positioned in said stack within said housing, said interface board being connected to said computer board;

a power board positioned in said stack within said housing, said power board being connected to said interface board and said computer board to provide electrical power to said interface board and said computer board;

said interface board having a pair of data inputs, one of said pair of data inputs receiving ARINC-429 navigation data from an inertial navigation unit located within said aircraft, said interface board storing said ARINC-429 navigation data therein;

said computer board including a computer software program for operating said computer board, said computer board, responsive to said computer software program, reading said ARINC-429 navigation data from said interface board and then converting said ARINC-429 navigation data to NMEA-0183 navigation data;

said computer board, responsive to said computer software program, reading a pair of parity bits within each of a plurality of data words within said ARINC-429 navigation data to determine when said data words contain valid navigation data;

said computer board providing a request to send signal to a moving map display located on board said aircraft to effect a transfer of said NMEA-0183 navigation data to said moving map display;

said computer board, responsive to a clear to send signal from said moving map display transferring said NMEA-0183 navigation data to said moving map display.

13. The protocol converter of claim 12 wherein said housing comprises a box shape structure having a length of 6.97 inches, a width of 4.95 inches and a height of 4.16 inches.

14. The protocol converter of claim 13 wherein said housing has a first flange attached to said front panel and a second flange attached to a rear panel of said housing, said first and second flanges being adapted for mounting said protocol converter on said aircraft, said first and said second flanges each having a pair of mounting holes, said protocol converter including said first and said second flanges having overall length of 7.95 inches.

15. The protocol converter of claim 12 wherein said power board provides said electrical power to said interface board and said computer board at power levels of +5 VDC, −5 VDC, +12 VDC and −12 VDC.

16. The protocol converter of claim 12 further comprising:

first, second, third and fourth indicator lights located on the front panel of said housing, said first, second, third and fourth indicator lights being connected to said interface board;

said first and second indicator lights when activated indicating which one of said pair of data inputs on said interface board is receiving ARINC-429 navigation data from a source;

said third and fourth indicator lights when activated indicating which of a pair of serial outputs on said computer board is transferring said NMEA-0183 navigation data to said moving map display.

17. The protocol converter of claim 12 further comprising a circuit breaker connected to said power board, said circuit breaker including a reset button to reset said circuit breaker after circuit breaker deactivates said protocol converter, said circuit breaker being mounted on the front panel of said housing.

18. The protocol converter of claim 12 further comprising a reset switch connected to said computer board, said reset switch being mounted on the front panel of said housing.

19. A protocol converter for use on board aircraft comprising:

a housing having a front panel;

a computer board positioned in a stack within said housing;

an interface board positioned in said stack within said housing, said interface board being connected to said computer board;

a power board positioned in said stack within said housing, said power board being connected to said interface board and said computer board to provide electrical power to said interface board and said computer board;

said interface board having a pair of data inputs, one of said pair of data inputs receiving ARINC-429 navigation data from an inertial navigation unit located within said aircraft, said interface board storing said ARINC-429 navigation data therein;

said computer board including a computer software program for operating said computer board, said computer board, responsive to said computer software program, reading said ARINC-429 navigation data from said interface board and then converting said ARINC-429 navigation data to NMEA-0183 navigation data;

said computer board, responsive to said computer software program, reading a pair of parity bits within each of a plurality of data words within said ARINC-429 navigation data to determine when said data words contain valid navigation data, said valid navigation data occurring whenever said pair of parity bits are a binary three;

said computer board providing a request to send signal to a moving map display located on board said aircraft to effect a transfer of said NMEA-0183 navigation data to said moving map display;

said computer board, responsive to a clear to send signal from said moving map display transferring said NMEA-0183 navigation data to said moving map display;

first, second, third and fourth indicator lights located on the front panel of said housing, said first, second, third and fourth indicator lights being connected to said interface board;

said first and second indicator lights when activated indicating which one of said pair of data inputs on said interface board is receiving ARINC-429 navigation data from a source;

said third and fourth indicator lights when activated indicating which of a pair of serial outputs on said computer board is transferring said NMEA-0183 navigation data to said moving map display.

20. The protocol converter of claim 19 wherein said housing comprises a box shape structure having a length of 6.97 inches, a width of 4.95 inches and a height of 4.16 inches, said housing having a first flange attached to said front panel and a second flange attached to a rear panel of said housing, said first and second flanges being adapted for mounting said protocol converter on said aircraft, said first and said second flanges each having a pair of mounting holes, said protocol converter including said first and said second flanges having overall length of 7.95 inches.

* * * * *